United States Patent Office 2,937,183
Patented May 17, 1960

2,937,183
PROCESS FOR PREPARING 4-AMINO-2-METHYL THIAZOLE

George de Stevens, Portland, and Robert H. Sprague, East Hampton, Conn., assignors to Sperry Rand Corporation, a corporation of Delaware No Drawing. Original application May 10, 1955, Serial No. 507,458, now Patent No. 2,892,834, dated June 30, 1959. Divided and this application December 4, 1958, Serial No. 792,547

2 Claims. (Cl. 260—306.8)

This invention relates to a new composition of matter. More particularly it relates to 4-amino-2-methyl thiazole and to a process for preparing same.

This application is a division of the co-pending application of George de Stevens et al., Serial Number 507,458, filed May 10, 1955, for Cyanine Dyes, now Patent No. 2,892,834.

It has been found that the new thiazole compound of this invention has many useful properties. For example, it is possible to prepare cyanine dyes therefrom which are capable of sensitizing photographic emulsions strongly and cleanly, i.e., without the production of excessive fog or residual dye stain.

It is known that cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain. With the thiazole compound of this invention, it is possible to prepare cyanine dyes in which one or both of the aforesaid auxochromic nitrogen atoms lie in a 4-aminothiazole nucleus.

Accordingly, it is the primary object of the present invention to provide the new thiazole compound 4-amino-2-methyl thiazole having the following formula

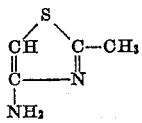

Also in accordance with this invention there is provided a process for preparing 4-amino-2-methyl thiazole by reacting dibromodioxane (Yanovskaya et al., fhur Obskchei Khim 22, 1594 (1952) C.A. 47, 8032 (1953)), or other brominating agents, i.e., N-bromosuccinimide, dibromatin, etc., with thioacetamide. The reaction proceeds as follows:

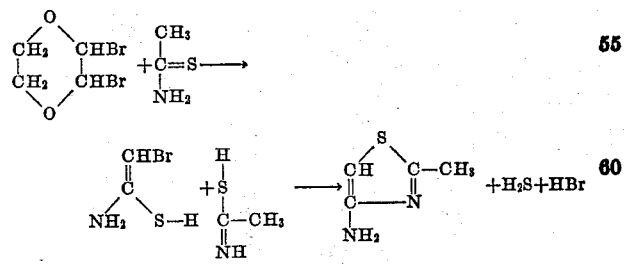

For a better understanding of the invention, together with other and further objects thereof, reference is had to the following description and its scope will be pointed out in the appended claims.

The following examples will serve to demonstrate the manner of preparation of my new thiazole and quaternary salts thereof. These examples are not intended, however, to limit my invention.

Example 1.—4-amino-2-methyl thiazole

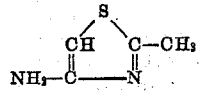

In a flask containing 400 g. (1 mol) of dibromodioxane chilled to 0°, there was added 133.2 g. (1 mol) of thioacetamide. A vigorous reaction immediately commenced, the reaction temperature rising to 60°. After this initial reaction subsided, the mixture was heated for 2 hours on the steam bath. On cooling, 150 ml. of water was added to the mixture. Some solid residue remained undissolved. The mixture was filtered and the filtrate was made alkaline to pH 10 with 10% sodium hydroxide. This was extracted with ether and the ether extract was dried over $K_2CO_3$. After removal of the ether by distillation, the residue was fractionally distilled at reduced pressure, the 4-amino-2-methyl thiazole distilling over at 50°/12 mm. Yield: 21 g., 9% of theoretical.

Example 2.—4-amino-2methyl thiazole methiodide

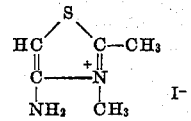

17 g. (1 mol) of 4-amino-2-methyl thiazole was heated on a steam bath for 4 hours with 18 g. (1 mol plus 10% excess) of methyl iodide. On cooling, the semi-solid cake was triturated first with ether and then with acetone. The white powder was collected on a filter, washed with acetone and dried in a desiccator. Yield: 6 g. 18% of theoretical. M.P. 235° d.

Example 3.—4-amino-2-methyl thiazole ethiodide

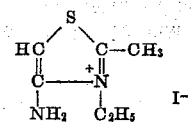

8 g. (1 mol) of 4-amino-2-methyl thiazole and 8 g. (1 mol +10% excess) of ethyl iodide were heated on the steam bath for 2 days. On cooling, a dark viscous material was obtained which was washed several times with ether. The residue was then washed with acetone, collected on a filter, washed again with acetone and dried in a desiccator. Yield: 3.0 g. 20% of theoretical, M.P. 205° d.

As starting material for the preparation of novel cyanine dyes, 4-amino-2-methyl thiazole is first converted to a quaternary salt by reacting it with an ester such as ethyl iodide set forth hereinabove in Examples 2 and 3. Other examples of esters are other alkyl halides, alkyl sulfates, alkyl-p-toluene sulfonates, etc. For purposes of convenience, the quaternary salts useful in preparing the new cyanine dyes can be represented by the single formula

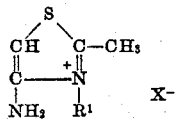

where R' represents an alkyl group such as methyl, ethyl, n-propyl, isobutyl, β-hydroxyethyl, β-methoxyethyl, β-ethoxyethyl, β-acetoxyethyl, β-carboxyethyl, carboxymethyl, β-carbomethoxyethyl, β-carbethoxyethyl alkyl, etc., or an aralkyl group such as benzyl, phenyl, etc., and X⁻ represents an anion, e.g., chloride, bromide, iodide, benzene sulfonate, p-toluene sulfonate, methyl sulfate, ethyl sulfate, thiocyanate, perchlorate, acetate, etc.

To prepare pseudocyanine dyes from such quaternary salts, they are reacted with 2-halogenoquinoline quaternary salts in the presence of an acid binding agent such as sodium ethylate, sodium carbonate, pyridine or a strong organic base such as triethylamine, trimethylamine and N-methylpiperidine. In this connection, it has been found advantageous to employ a mixture of pyridine with a strong tertiary organic base.

Instead of 2-halogenoquinoline quaternary salts, there can be employed 2-alkylmercapto or 2-arylmercaptoquinoline quaternary salts to condense with the quaternary salts of the 4-amino-2-methyl thiazole in the presence of an acid binding agent.

Using 2-halogenopyridine quaternary salts instead of 2-halogenoquinoline quaternary salts, there can be prepared pyrido-cyanine dyes containing a 4-aminothiazole nucleus.

Using 2-alkyl mercapto or 2-aryl mercapto benzothiazole or naphthothiazole salts, there can be prepared simple cyanine dyes other than pseudocyanine dyes.

To prepare symmetrical carbocyanine dyes from 4-amino-2-methyl thiazole quaternary salts, they are reacted with esters of ortho acids, e.g., ethyl orthoformate, ethyl orthoacetate, ethyl orthopropionate and ethyl orthobenzoate in the presence of pyridine or a mixture of pyridine and triethylamine.

To prepare unsymmetrical carbocyanine dyes from 4-amino-2-methyl thiazole quaternary salts, they are reacted with cycloammonium quaternary salts containing a β-aryl aminovinyl group in the alpha or gamma position, i.e., in one of the so-called reactive positions in the presence of an acid binding agent, e.g., pyridine or pyridine and triethylamine.

To prepare styryl dyes from the new quaternary salts of this invention, they are condensed with p-dialkyl aminobenzaldehyde in the presence of an alkaline catalyst such as piperidine in absolute ethanol solution.

To prepare merocarbocyanine dyes from 4-amino-2-methyl thiazole quaternary salts, they are condensed with ketomethylene heterocyclic intermediates containing an aryl aminomethylene group in the 5-position in the presence of an acid binding agent, e.g., pyridine plus triethylamine. Examples of such ketomethylene intermediates are 5-acetanilidomethylene-3-ethyl rhodanine, 5-acetanilidomethylene - 3 - ethyl - 1 - phenyl - 2 - thiohydantoin, etc.

To sensitize photographic silver halide emulsions with the aforesaid dyes, they are dispersed in the emulsions such as the conventional gelatino-silver halide, e.g., gelatino-silver bromide, bromoiodide, chloride and chlorobromide. The methods of incorporating these dyes in the emulsions are simple and well known to those skilled in the art, and described in various patents and publications. A typical method, for example, is the one described in U.S. Patent 2,336,843, patented December 14, 1943.

While there have been described what are at present considered to be the preferred embodiments of this invention, it will be obvious to those skilled in the art that various changes and modifications may be made therein wihtout departing from the invention, and it is, therefore, intended to cover all such changes and modifications as fall within the true spirit and scope of the invention.

What is claimed is:

1. A process for preparing 2-methyl-4-amino thiazole consisting of reacting 2,3-dibromo p-dioxane with thioacetamide at 0° centigrade under anhydrous conditions.

2. A process for preparing 2-methyl-4-amino thiazole consisting of reacting 2,3-dibromo p-dioxane with thioacetamide at 0° centigrade in absolute ethanol solution.

References Cited in the file of this patent

UNITED STATES PATENTS

| | | |
|---|---|---|
| 2,756,227 | Heseltine | July 24, 1956 |
| 2,882,160 | De Stevens | Apr. 14, 1959 |

OTHER REFERENCES

Ganapathi et al.: Chem. Abstracts, vol. 40, col. 4059 (1946).

Cacioppo et al.: Chem. Abstracts, vol. 46, p. 558 (1952).